Aug. 4, 1964 L. DANILEWICZ ETAL 3,143,290
ROTARY CONVERTER
Filed April 17, 1961
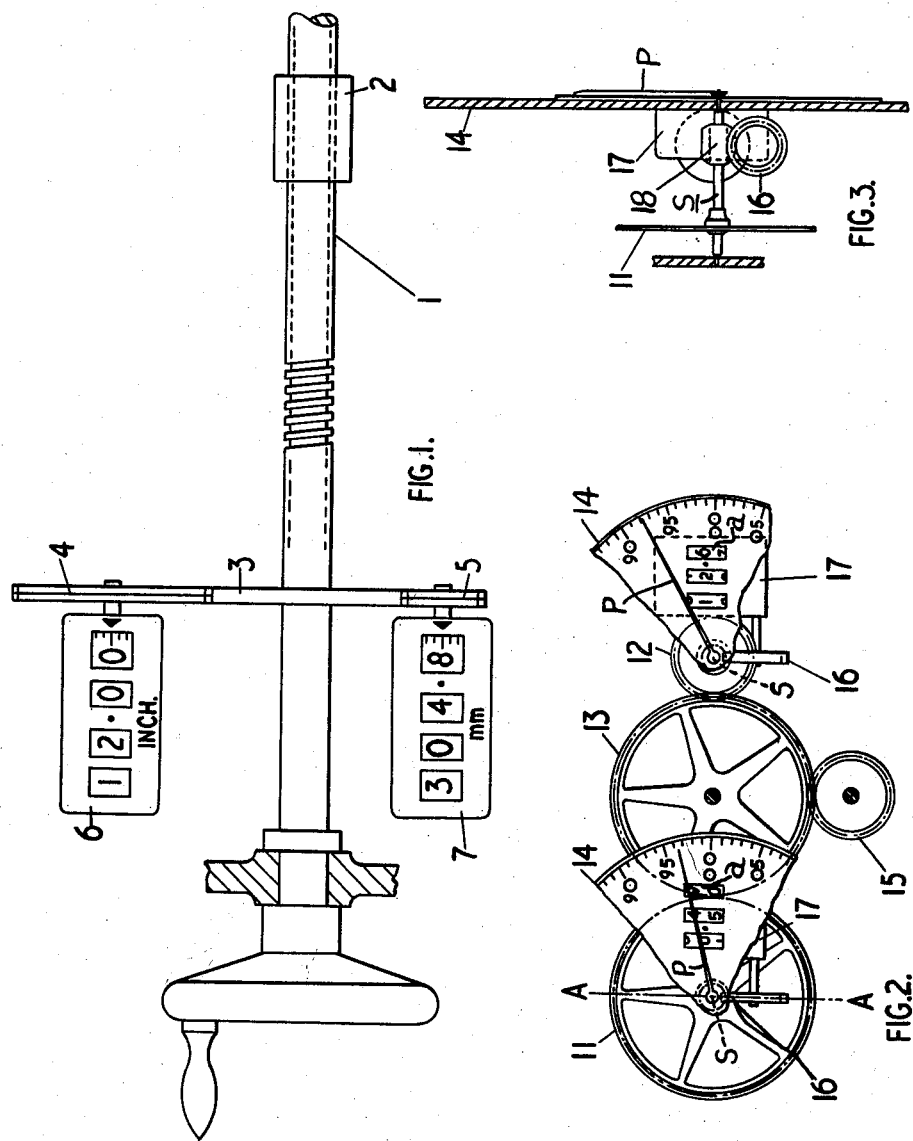

1

3,143,290
ROTARY CONVERTER
Ludomir Danilewicz, Wembley Park, and Leonard Stanislaw Danilewicz, Ruislip, England, assignors to Hydroforce Limited, London, England
Filed Apr. 17, 1961, Ser. No. 103,621
Claims priority, application Great Britain Apr. 21, 1960
2 Claims. (Cl. 235—61)

This invention relates to devices for converting units of one measuring system into units of another, so that, for example, a measurement expressed in inches can be read off in terms of millimetres and vice versa, or any given monetary system can be read in terms of sterling and vice versa. Devices which will serve this function are of course already known, but they generally require that one scale or equivalent part be pre-set to the desired value whereupon the other scale or equivalent part can be caused to show the desired conversion value. It is one object of the present invention to avoid the need for any such pre-setting operation. A further object is the provision of a device of the kind referred to, which is self setting in that it does not require manual adjustment. Yet another object is to provide a device of the kind referred to in which the respective values can be read off in numeral form directly.

The present invention consists in a device for converting numerical values from one unit system to another, comprising respective value registering means and a common rotary drive mechanism for driving said means at a predetermined ratio corresponding to the relationship between said systems.

In the preferred arrangement, the drive mechanism includes an electric motor which may be battery driven and associated with speed control and/or reversing means. In use, the motor will be operated until the recording means for the one system shows the desired value, when the corresponding value in the other system can be read off. The incorporation of speed control means enables any desired value to be approached rapidly and then, in the last stages more slowly. Suitable battery driven electric motors are available of small size, for example of a size incorporated in toy electric trains, enabling the complete device to be of pocket size.

The value registering means may be in the form of a linear scale associated with a slide or pointer, and to increase the accuracy, additional value registering means may be incorporated to indicate the number of revolutions. In the preferred arrangement, each value recording device is constituted by or comprises a counter, which may present continuously and/or step-wise moving number wheels. Such counters may represent the sole value registering means, or may for example be used in conjunction with a linear scale to show the number of revolutions of the scale dial or pointer, the scale itself then showing subdivisions of the lowest order of the counter.

The value registering means may be mounted separately on the instrument, or may superposed. For example, the device may have the appearance of a pocket watch with, in one case, both fingers on one face with a suitable gearing between them, and in the other case, having respective fingers to read against dials on opposite faces.

Where the recording devices are motor driven as described above, high speeds, say up to 3000 r.p.m. for the top speed, may be employed and, using a counter associated with a revolving dial or finger, an acuracy of 1 in 40,000 can be reached with a setting time of only a few seconds. A gearing of 25.4:1 is suitable for converting millimetres into inches. Where the ratio represents a value which it is difficult to obtain directly by a positive drive connection, a compensating drive can be applied between the orders of the value registering device.

2

For example, when converting metric weight units to tons, pounds and ounces, a correction of 8 ounces per ton can readily be made to the reading by suitable connection between the ton and ounce or pound order wheels. Where a counter is employed the number wheels can be geared together in a suitable manner; in the case of a dial and pointer, the correction can be applied to the normally stationary member.

For high speed operation, such as is necessary in the preferred embodiments of the invention, it is difficult to provide for snap action of the number wheels of the counter. For this reason, it is desirable that the viewing arrangements for the number wheels should be such that two successive numbers should be visible at the same time, at least during the transition period when the scale reading is approaching zero. The number wheels will then remain substantially stationary during a major part of the pointer revolution, but as the pointer is approaching its maximum reading to return to zero, the lowest order wheel at least will commence to move. Unless a little thought is given to the matter, it may not be immediately obvious to the relatively unskilled which of the two numbers visible on the moving wheel should be taken.

For this purpose the number wheels may be arranged for viewing at a position where they will be overlaid by the pointer as the latter approaches its zero position, and so that the number to be read moves in the opposite direction to the overlying pointer, the correct reading to be taken then being generally underneath the pointer in the vicinity of the zero position.

For example, if the pointer moves in a clockwise direction and the zero position is in the "quarter past" position, then the counter will be arranged to be visible through a window also substantially at the quarter past position the numeral wheels turning clockwise is viewed from the right. If then for the lowest order numeral wheel in the vicinity of the zero position of the pointer the numbers 8 and 9 were visible, and assuming the pointer scale to be graduated 0–99, then at a scale reading of say 98 or 99 the pointer will overlie the figure 8, whilst at a scale reading of zero, the pointer will overlie the number 9. This is of considerable help in avoiding error especially when the reading is taken hurriedly.

A valuable feature of the present invention lies in its application to measuring instruments which normally give a reading in one unit system only or, if two unit systems are provided for, require the reading of small divisions on a common sliding scale. In one embodiment of the present invention, a measuring instrument, for example a micrometer, incorporating an adjustment member is furnished with respective counters arranged to be driven by the adjustment member at the appropriate gear ratio to provide value readings in numerical form in respective unit systems. The lowest order units can be exhibited by a linear scale separate from the counter but in driven connection therewith. In this way, a micrometer may be made to give direct numerical readings in both inches and millimetres which can be read without the aid of a magnifying lens and by persons unskilled in the use of the conventional micrometer markings.

The invention will be further described with reference to the accompanying drawings, wherein:

FIGURE 1 is a diagrammatic illustration of a first embodiment of the invention;

FIGURE 2 is a plan view illustrating a second embodiment; and

FIGURE 3 is a partial section on the line A—A of FIGURE 2.

Referring first to FIGURE 1, there is shown a lead screw 1 co-operating with a nut 2 and forming part of a machine tool micrometer. A toothed wheel 3 rotates with screw 1 and meshes with toothed wheels 4 and 5 respectively driving inch and millimeter counters 6 and 7.

As an example, with a lead screw having 10 threads to the inch, the toothed wheels 3 and 4 may each have 127 teeth, while toothed wheel 5 has 50 teeth. The counters 6 and 7 may then be simple revolution counters with each revolution counting 1 mm. or .1 inch, the end figure showing the progress of the incomplete revolution.

The toothed wheels 4 and 5 are split and spring loaded to suppress backlash.

Referring now to FIGURES 2 and 3, there are shown toothed wheels 11 and 12 driven by an idling toothed wheel 13 itself driven by a toothed wheel 15 on a drive shaft. As in the previous embodiment the device is arranged to show equivalent readings in inches and millimetres and for this purpose the toothed wheels 11 and 12 may have 127 and 50 teeth respectively.

Each of the toothed wheels 11 and 12 is mounted on a shaft $s$ carrying a pointer $p$ indicating the progress of the current revolution on a calibrated dial 14. The shafts $s$ also carry worms 18 meshing with worm wheels 16 which drive revolution counters 17. Apertures $a$ for viewing the number wheels are provided in the dial and are of such dimensions that during a transition two numbers are visible simultaneously.

It will be seen that as the pointer approaches its zero position, i.e. during such a transition, it overlies, and therefore emphasises, the number which is to be read off, thereby facilitating quick and accurate reading.

The drive means for the device may comprise an electric motor and, in addition, a manual drive connection is provided to the transmission. This manual drive connection may be permanently connected to the transmission, or may be engageable therewith when required, for example, like the finger adjustment on a watch. In one convenient arrangement, the manual drive connection may comprise a knob to be turned by the fingers and this may be connected to a gear member driven by the electric motor so that it spins when the motor is driven.

Various modifications may be made within the scope of the invention. Thus the device of FIGURE 1 may be motor driven if desired.

We claim:

1. An apparatus for converting numeral values from one unit system to another unit system, comprising a value registering means for each unit system, each value registering means including a revolution counter having at least one number wheel, a dial having a linear scale thereon and a pointer, a gear for each registering means, a shaft on which each gear is mounted, a further gear meshing with each of said first named gears for driving said gears at a predetermined ratio corresponding to the relationship between the systems, continuous carry mechanism between the gears, each pointer being secured to the shaft and overlying the dial, and gear means between each shaft and each revolution counter for driving said at least one number wheel in a direction opposite to the direction of movement of the pointer so that when the pointer approaches the zero position of the linear scale, the number wheel will be overlaid by the pointer with the correct reading being generally underneath the pointer in the vicinity of the zero position.

2. An apparatus for converting numeral values from one unit system to another unit system, comprising a value registering means for each unit system, each value registering means including a revolution counter having at least one number wheel, a dial having a linear scale thereon and a pointer, a shaft for each value registering means, each pointer being secured to the shaft and overlying the dial, means for driving said shafts at a predetermined ratio corresponding to the relationship between the systems, continuous carry mechanism between the driving means, said dial having an aperture therein in proximity to the zero position of the linear scale of such dimensions that two successive numbers on the number wheel are simultaneously visible, and drive means between each shaft and each revolution counter for driving said at least one number wheel in a direction opposite to the direction of movement of the pointer so that when the pointer approaches the zero position of the linear scale, the uppermost number of the wheel visible in the aperture will be overlaid by the pointer with the lowermost number below the pointer in the vicinity of the zero position being the correct reading.

References Cited in the file of this patent

UNITED STATES PATENTS

| | | |
|---|---|---|
| 601,686 | Stubbs | Apr. 5, 1898 |
| 755,084 | Vermehren | Mar. 22, 1904 |
| 1,663,211 | McNab | Mar. 20, 1928 |
| 2,318,591 | Couffignal | May 11, 1943 |
| 2,911,144 | Lee et al. | Nov. 3, 1959 |